Dec. 6, 1932.  W. A. GIBBS  1,890,377
ANIMAL TRAP
Original Filed Aug. 10, 1926   4 Sheets-Sheet 1
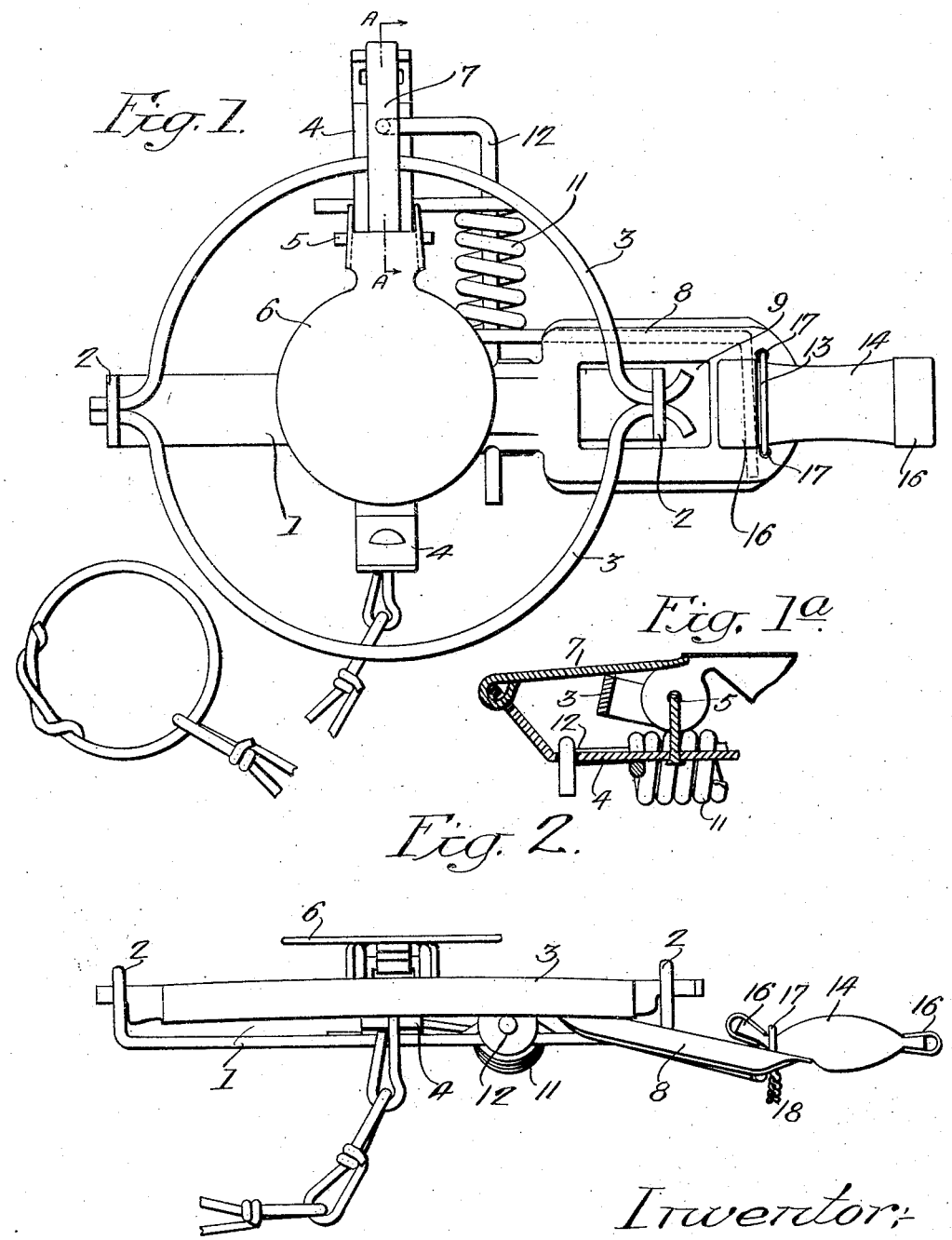

Dec. 6, 1932.  W. A. GIBBS  1,890,377
ANIMAL TRAP
Original Filed Aug. 10, 1926  4 Sheets-Sheet 2

Inventor:—
Walter A. Gibbs,
by his Attorneys,
Howson & Howson

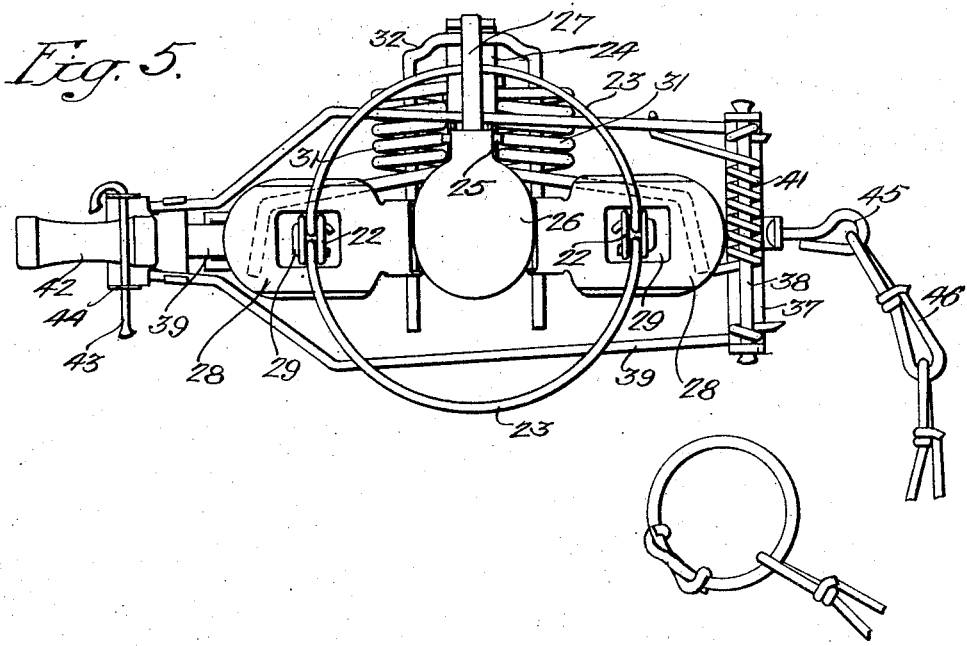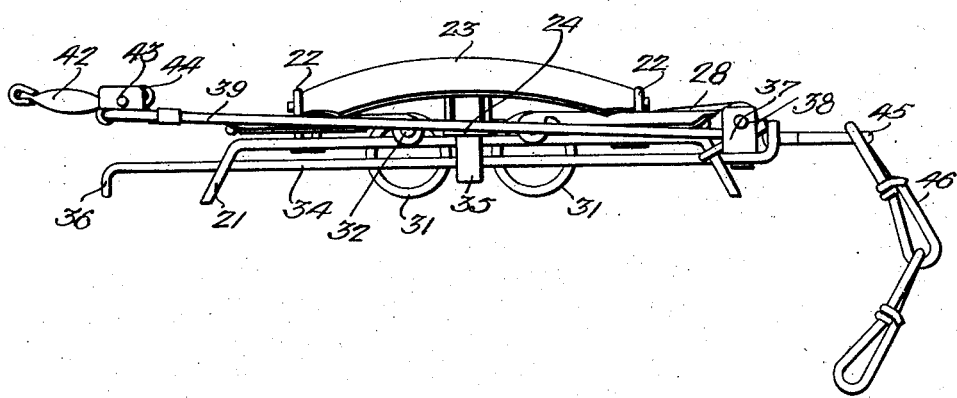

Dec. 6, 1932.    W. A. GIBBS    1,890,377
ANIMAL TRAP
Original Filed Aug. 10, 1926    4 Sheets-Sheet 4
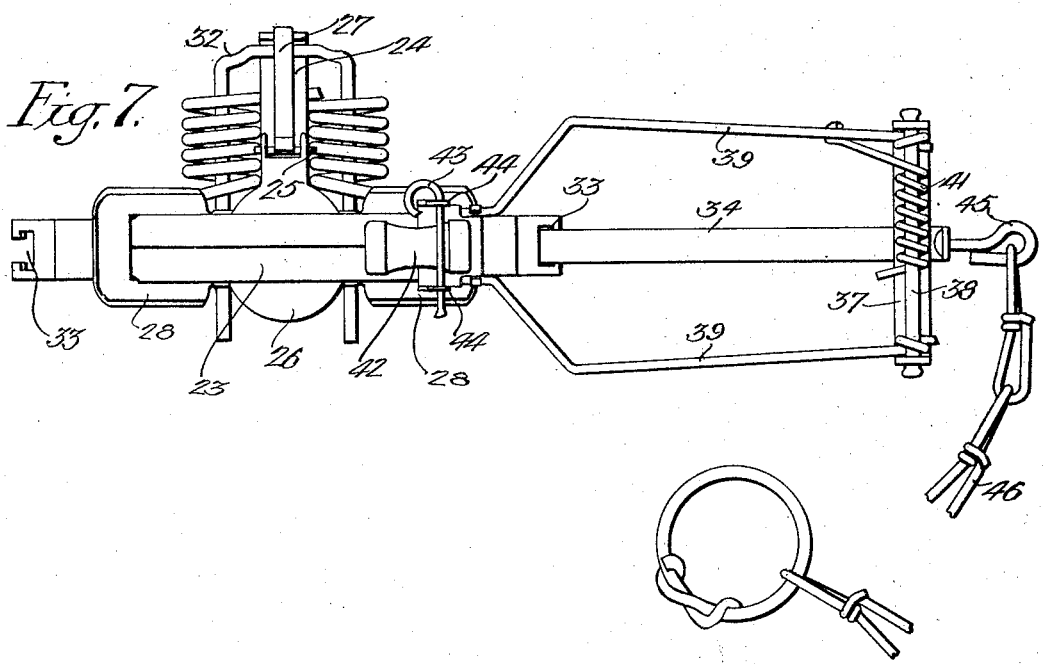
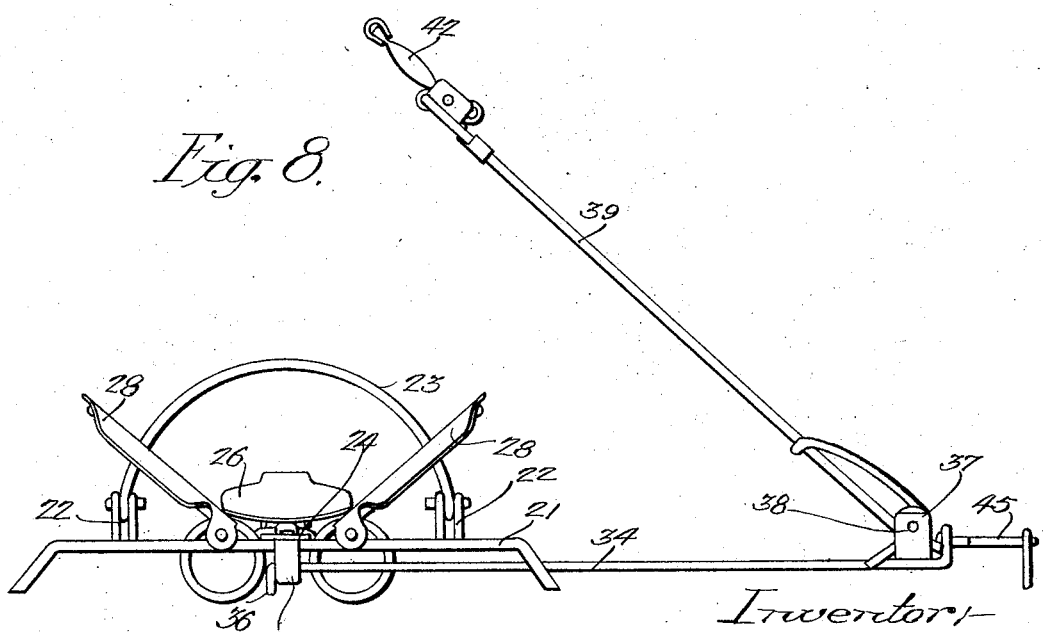
Inventor:-
Walter A. Gibbs,
by his Attorneys,
Howson & Howson Patented Dec. 6, 1932

1,890,377

UNITED STATES PATENT OFFICE

WALTER A. GIBBS, OF HOLLY OAK, DELAWARE

ANIMAL TRAP

Application filed August 10, 1926, Serial No. 128,438. Renewed May 24, 1930.

This invention relates to improvements in animal traps, and one of the objects of the invention is to provide a trap for catching animals that will be more efficient than the traps now commonly employed.

Another object of the invention is to produce in practical form a humane trap for catching animals.

Many animals fairly caught in the present forms of steel traps escape by "pulling out" or by amputating the leg or part gripped by the trap. Other forms of traps also lack efficiency due to the length of time that elapses between the time the animal is caught and the time it dies or loses its powers of resistance. Much of this inefficiency can be obviated by killing the trapped animal quickly after it is caught in the trap, and it is apparent that the humane object also is accomplished in this manner by relieving the suffering of the animal.

It is, therefore, a specific object of the present invention to provide efficient and humane means for quickly killing the animal after it is caught.

The invention further contemplates the utilization of the natural instinct of self-preservation which causes a trapped animal to fight and to bite at those parts of the trap which restrain it, and it accordingly is a further object of the invention to provide drug or poison-containing receptacles or holding means puncturable by the teeth of the animal and so arranged in the trap that the trapped animal may reach them to bite and rupture them.

The efficiency of the device may be improved by attaching the poison or drug containers in such manner that the attention of the trapped animal will be especially directed to them.

In the attached drawings:

Figure 1 is a plan view of a trap made in accordance with my invention, the trap being shown in the open position;

Fig. 1a is a section on the line a—a, Fig. 1;

Fig. 2 is a side elevation of the open trap shown in Fig. 1;

Fig. 5 is a plan view of a second form of trap embodying my invention, the trap being in the open or set position;

Fig. 6 is a side view of the open trap shown in Fig. 5;

Fig. 7 is a top view of the trap shown in Figs. 5 and 6 but in the closed position, and Fig. 8 is a side elevation of the trap in the sprung condition.

Figure 3:
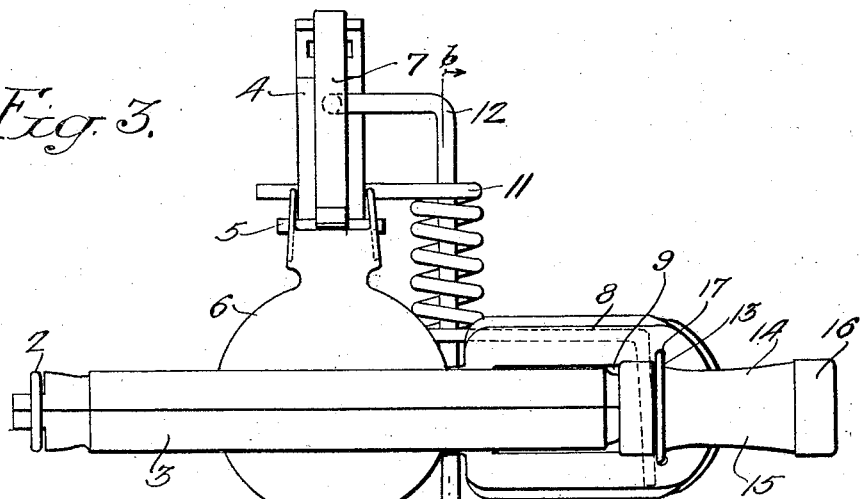
Fig. 3 is a top view of the trap shown in Figs. 1 and 2 when closed.

Referring to Figs. 1 to 4, inclusive, the trap therein illustrated comprises the usual base consisting of a flat substantially rigid steel strap 1 having upturned end portions 2 in which are journaled jaws 3—3. The base further comprises a transversely extending arm 4 to which is pivotally secured, at 5 a treadle 6, and the arm 4 also carries loosely secured thereto at its outer end a latch member 7 which when the trap is set as shown in Fig. 1 overlies one of the jaws 3 and has its free end secured under the rear portion of the treadle 6, thereby locking the jaw in the open position. The general form and operation of these parts will be readily understood by those familiar with the art.

Figure 3A:
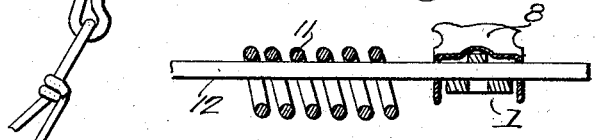
Fig. 3a is a section on the line b—b, Fig. 3.
Figure 4:
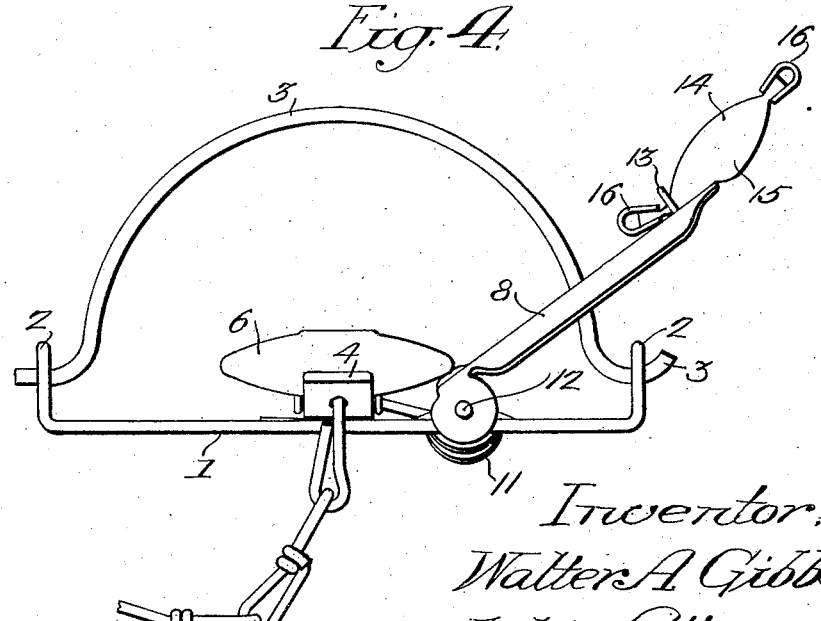
Fig. 4 is a side elevation of the trap closed as shown in Fig. 3.

The jaws 3—3 are actuated in the present instance through a pivoted actuating lever having an aperture 9 adapted to embrace one end of the jaws 3—3 in well known manner. This actuating lever which is of well known form is actuated by means in the present instance of a spring 11 carried by a rod 12 whose ends are supported respectively in the arms 1 and 4 of the base, as shown in Figs. 1a and 3a; and which also constitutes the pivot of the actuating lever. One end of the spring 11 underlies the arm 4, while the other end of the spring bears against the back or underside of the actuating lever 8, the spring 11 thereby tending to force the actuating lever upwardly from the position which it occupies when the trap is set, as shown in Figs. 1 and 2, to an elevated position shown in Figs. 3 and 4, in which the jaws are pressed and held together by the spring through the medium of the said actuating lever.

In the present instance, I have secured to the outer end of the lever 8 by means of a staple 13 a container 14 for a drug or poison to be administered to the animal. The container 14 preferably is elongated and projects beyond the outer end of the lever 8, as clearly illustrated, whereby when the trap is sprung and the lever 8 has assumed the elevated position, the container 14 is carried into a conspicuous position with respect to the trapped animal so that the attention of the animal is directed to it. The container is made of a material readily puncturable by the teeth of the animal, and I have found rubber well adapted for this purpose, although there is no limitation in the material of which the container is made.

The container illustrated consists of a piece of rubber tubing 15 forming the body of the container which is filled with the drug or poison and which is thereafter clamped at the ends by means of metal clips 16, as clearly illustrated. As previously stated, this container is secured to the actuating lever 8 by means of a staple 13 which, as well illustrated in Figs. 1 and 2, consists of a loop of wire passed around the container 14 and through apertures 17—17 in the lever 8 and twisted together on the under side of the lever, as illustrated at 18 in Fig. 2. Other methods, however, may be used to secure the container in position, although it is desirable that the retaining means be such that a ruptured container may be readily removed and replaced by a new one.

In the form of trap illustrated in Figs. 5 and 8, inclusive, I have illustrated other means for causing the trapped animal's attention to be directed to the drug or poison container so that there will be a natural tendency for it to bite the container. In this instance, the base comprises an elongated arm 21 which supports near its opposite ends bracket arms 22—22 in which are journaled the ends of the jaws 23. The base also comprises a transversely extending arm 24 to which is pivotally secured at 25 a treadle 26, and loosely secured to the outer end of this arm 24 is a latch 27 whose inner end, when the trap is set, fits beneath the treadle 26 in well known manner and retains the jaws 23 in the open position. In this instance the trap comprises two pivotally mounted actuating levers 28, each of which has a central aperture 29 adapted respectively to embrace the opposite ends of the jaws 23 in well known manner to hold the jaws in the closed position. The actuating levers 28 are actuated by a pair of springs 31—31 which are held respectively on the parallel arms of a U-shaped rod 32 held in a suitable manner on the arms 21 and 24 of the base. In the present instance, these same parallel arms of the rod 32 constitute pivotal supports for the actuating levers 28. One end of each of the springs 31 lies under the arm 24, while the opposite ends of the springs bear against the back or under sides of the respective actuating levers 28 and tend to force these levers into an elevated position to bring the jaws together and to so retain them.

In the present instance, the extremities of the arm 21 of the base are turned downwardly, as well shown in Figs. 6 and 8, and each end is provided with a T-shaped recess 33, see Fig. 7, in which recesses are adapted to slide a flat rod 34. I also provide on the under side of the arm 21 a guide 35 for said rod 34 which in conjunction with the down turned extremity 36 of said rod functions also as a stop limiting the sliding movement of the arm in one direction, as shown in Fig. 8.

At the outer end of the rod 34 is a cross arm 37, in the upturned ends of which is mounted a shaft or rod 38 on which is journaled an arm 39, this arm 39 having two branches, as clearly illustrated, held by the said shaft 38. The shaft 38 also carries a spring 41 which operatively engages one branch of the arm 39 and tends to elevate the arm into the position shown in Figs. 7 and 8. At the outer end of the arm 39 is secured by suitable means a container 42, such as that previously described, which contains a tube of poison and which is so made as to be readily punctured by the teeth of an animal caught in the trap whereby the drug or poison may be self-administered to said animal. The holding means in this instance consists of a pin 43 detachably held in lugs or ears 44, 44 on the outer end of the arm 39, between which and the said arm the container 42 is held, as clearly illustrated. The container 42 is releasable by withdrawing the pin 43.

At the outer end of the arm 34, to which is secured the transverse arm 37 and the shaft 38 for the arm 39, I provide a hook 45 or similar means for anchoring the trap, there being in the present instance a chain 46 attached to said hook.

When the trap is set, the sliding rod 34 and the arm 39 are made to assume the position illustrated in Figs. 5 and 6, the space between the branches of the arm 39 being sufficient to enable them to embrace the actuating levers 28. When the trap is set, therefore, the branches of the arm 39 underlie the spread jaws 23, as shown in Fig. 5, and by these jaws the arm is maintained in the depressed position. When the trap is sprung, however, and the jaws are elevated, the arm 39 immediately swings upwardly, and then the animal in its efforts pulls the trap against the anchor chain 46, the entire trap is moved outwardly on the rod 34 until further movement is prevented by the arm 39 which embraces the body, leg or that part of the animal which is held in the trap and restrains it from further movement away from the anchor. The animal feeling the restraining effect of the arm 39 instinctively attacks that part and has a tendency to bite the container 42 and thereby administer to itself the contained drug or poison.

It will be understood that the device in principle may assume other embodiments from those herein illustrated, and that in its essential features the invention resides in attaching to a trap a puncturable receptable for poison or drug in such manner that the trapped animal may reach it to bit and rupture it, and preferably in a position where the attention of the trapped animal will be directed to it.

I claim:

1. An animal trap comprising means for gripping and holding an animal, a rupturable container movable into position to be ruptured by the trapped animal and means for moving said container.

2. An animal trap comprising means for gripping and holding an animal, a rupturable container on said trap lying in an inconspicuous position when the trap is set, and means operable to move said container into a conspicuous position so that the same may be ruptured by the trapped animal.

3. An animal trap comprising means for gripping and holding an animal, a rupturable container on said trap lying in an inconspicuous position when the trap is set, and means for rendering said container conspicuous by operation of said gripping and holding means.

4. An animal trap comprising means for gripping and holding an animal, a rupturable container on said trap and means operable upon actuation of said gripping and holding means for conspicuously displaying said container to said trapped animal.

5. An animal trap comprising means for gripping and holding an animal, means for setting said trap, an arm pivoted to the trap and lying beneath the gripping and holding means when the trap is set, said arm normally opposing setting of said gripping and holding means, a rupturable container on said arm lying in an inconspicuous position when the trap is set, and means for moving said arm and receptacle to conspicuous position when the gripping and holding means are actuated.

6. In an animal trap, the combination with animal-retaining means, of a receptacle available for attack by an animal held by said retaining means and vulnerable to said attack whereby the contents of the receptacle may be self-administered by the trapped animal.

7. In an animal trap, the combination with animal-gripping jaws, and actuating means therefor, of a receptable available for attack by an animal gripped by said jaws and vulnerable to said attack whereby the contents of the receptacle may be self-administered by the trapped animal.

8. In an animal trap, the combination with animal-gripping and -retaining means, of a normally unalluring drug-containing element so disposed with relation to said means that it is subject to attack by the trapped animal.

WALTER A. GIBBS.